H. R. RUSE.
SHOW CASE.
APPLICATION FILED DEC. 22, 1914.
1,173,872. Patented Feb. 29, 1916.
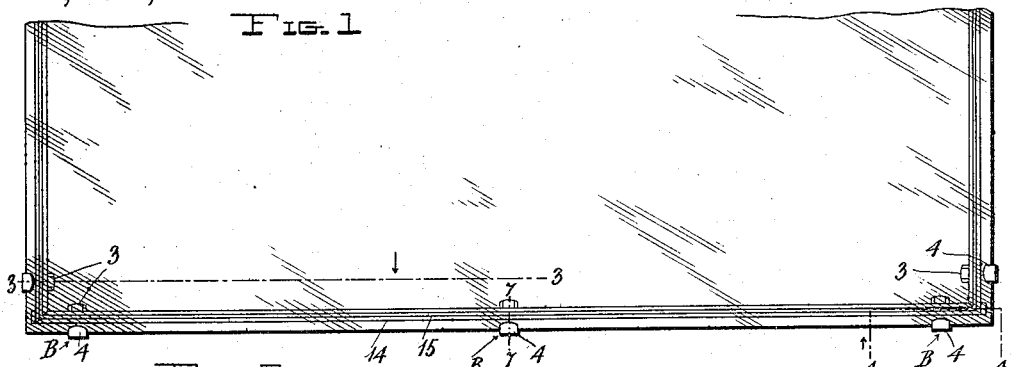
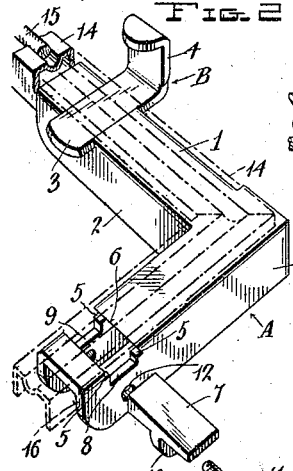
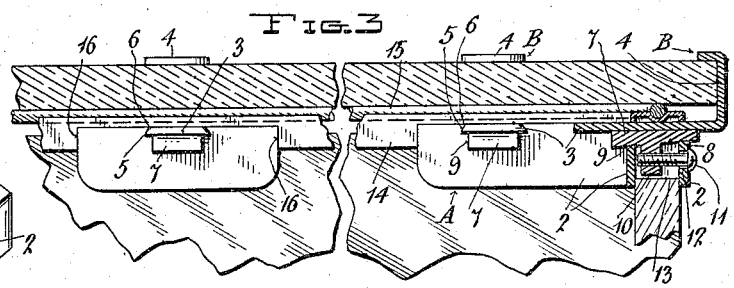
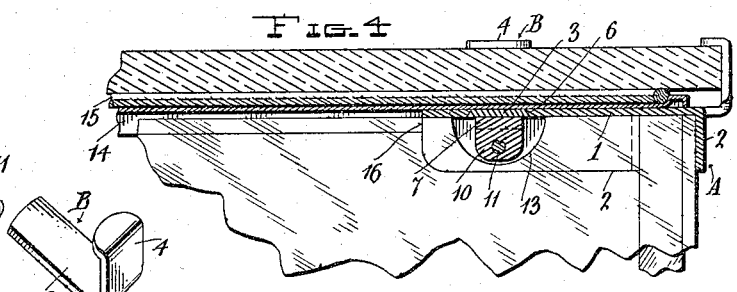
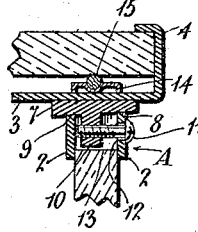
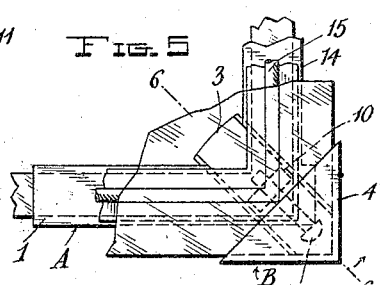
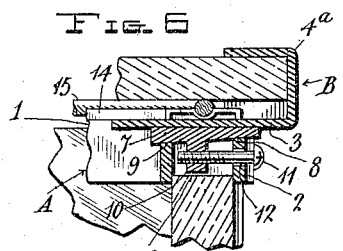
Witnesses
Inventor
Harry R. Ruse,
by
Attorney.

UNITED STATES PATENT OFFICE.

HARRY R. RUSE, OF BALTIMORE, MARYLAND.

SHOW-CASE.

1,173,872.  Specification of Letters Patent.  Patented Feb. 29, 1916.

Application filed December 22, 1914. Serial No. 878,561.

*To all whom it may concern:*

Be it known that I, HARRY R. RUSE, a citizen of the United States, residing at Baltimore, in the State of Maryland, have invented new and useful Improvements in Show-Cases, of which the following is a specification.

This invention relates to improvements in show cases which are constructed wholly of glass and without framing and it has more particular reference to the fastenings employed at and intermediate the corners of the case for effecting a secure connection between the vertical and top plates.

The objects of the invention, briefly stated, are to provide fastenings of the character mentioned which may be manufactured at relatively low cost, which effect a particularly secure and reliable connection of the vertical and top plates, which do not impose any stresses upon the vertical plates or the top plate in connection with the retention of the latter, which are not liable to become loose by reason of vibrations, and which are so constructed that all operations in connection with the fitting of the top plate may be performed from the exterior of the case.

Heretofore devices for securing together the plates of glass of show cases have been usually fastened to the plates or secured in position, from the interior of the case, which operation often results in breaking the glass during the course of construction of the case; and, also, requires great effort and inconvenience in properly securing the plates together. These fastening devices, which, in so far as they embody adjustably related companion clip members, are of the same general construction as here disclosed, usually employ a set screw having threaded connection with the clips or clamping members and which is adapted to draw the same into clamping engagement with the glass plates of the show case. To secure the glass plates together, the clamping members must be drawn by the set screw into tight engagement with the plates which causes a great amount of pressure or stress to be exerted upon the edges of the plates and very frequently results in chipping the edges of or cracking said glass plates.

It is, therefore, also, an object of the invention to overcome these objectionable features, by providing means whereby the clips may be fastened into clamping engagement from the exterior of the case, and by providing means whereby the clips may be placed into clamping position with the plates and then locked or fixed in said position without exerting any pressure or stress against the edges of the glass plates.

Embodiments of the invention, both for corner and intermediate fastenings, are illustrated in the accompanying drawings, wherein:—

Figure 1 is a plan view of the front portion of a show case embodying the fastenings of the present invention; Fig. 2 is a detail perspective view, (with parts disassembled), of a preferred construction of corner fastening; Fig. 3 is an enlarged sectional view on the line 3—3 of Fig. 1, looking in the direction of the arrow; Fig. 4 is an enlarged sectional view on the line 4—4 of Fig. 1, looking in the direction of the arrow; Fig. 5 is a detail plan view of a modified construction of corner fastening; Fig. 6 is a sectional view on the line 6—6 of Fig. 5; Fig. 7 is an enlarged sectional view on the line 7—7 of Fig. 1 showing a fastening intermediate the corner fastenings.

Similar characters of reference designate corresponding parts throughout the several views.

The improved fastening consists essentially of two connected clips, one of which, for engagement with the vertical plates of the show case, and designated generally as A, has an inverted channel-shape cross-section and consists of a plate 1 provided with depending parallel side walls 2, and the other of which, for engagement with the top plate of the show case, and designated generally as B, includes a base 3 which is transversely adjustable relatively to the plate 1 and has at its outer end an overhanging hook-like lug 4 which fits over the edge of the top plate of the show case.

The base 3 has a dove-tail cross-section and is fitted for sliding adjustment in alining dove-tail recesses 5 provided at the upper edges of the walls 2. The plate 1 is cut away as at 6 between the recesses 5 and the base 3 occupies the cut-away portion 6 of the plate 1 and is flush with the upper surface of said plate.

The base 3, as stated, is slidable in the recesses 5 in order that it may be adjusted transversely of the clip A to any desired position. The clip B is held in any desired position to which it may be adjusted by a lock member 7 which is arranged under the base 3 and has its end portions fitted in recesses 8 and 9 arranged below and communicating with the dove-tail recesses 5. The member 7 has a wedge form, its upper face being flat and engaging against the under face of the base 3 and its lower face being inclined at a suitable angle upwardly and outwardly. The recess 8 which accommodates the outer end portion of the member 7 is of less depth than the recess 9 which accommodates the thicker inner end portion of the member 7 and both of said recesses 8 and 9 preferably have their horizontal faces inclined conformably to the inclination of the under face of said member. Obviously, if the member 7 be moved outwardly across the clip A, it will cause the base 3 to bind in the recesses 5 and, hence, will secure the clip B at any position to which it is adjusted. To effect movements of the member 7 transversely of the clip A, said member is provided with a depending lug 10 having a threaded opening and an adjusting screw 11 engages in the threaded opening of said lug, said screw passing loosely through a slightly elongated opening 12 formed in the outer wall 2 of the clip A and having its head engaged against said outer wall. To effect an adjustment of the clip B relatively to the clip A, the screw 11 is manipulated to move the member 7 inwardly to a sufficient extent to permit the base 3 to be moved freely in the recesses 5. Thereupon, the clip B is moved to the position wherein its hook-like lug 4 engages over the edge of the top plate of the show case and when the clip B has been moved inwardly as far as the edge of the top plate of the show case will permit, the screw 11 is again manipulated to move the member 7 outwardly, whereby the latter, by virtue of its wedge thrust, exerts sufficient pressure against the base 3 to hold said base immovable and thus to fix the clip B in its operative position. The vertical plates of the show case have their upper edges provided with suitable recesses 13 ot accommodate the lugs 10 of the several fastenings.

The engaging beveled faces of the recesses 5 and the base 3 may, if desired, be suitably roughened by machining or milling to insure that their frictional engagement shall be sufficiently strong or secure to prevent accidental displacement of the base 3 when the latter is operatively engaged or held by the wedge member 7.

The features of construction above described are applicable to both corner and intermediate fastenings and to fastenings which are adapted for use with inclined show case front plates as well as to fastenings which, like those shown, are adapted to perpendicular show case front plates.

In the construction shown in Fig. 1, the only difference between the intermediate fastenings and the corner fastenings is that the clips A of the intermediate fastenings are straight throughout their extent, whereas the clips A of the corner fastenings are of angular form, having a substantial L-shape, and each arm of the clip A of the corner fastening carries a clip B and the described means for effecting the adjustment of said clip B. In other respects the corner fastenings and the intermediate fastenings employed in the construction of Fig. 1 are identical.

Figs. 5 and 6 show a slightly modified construction of corner fastening. Whereas the corner fastening construction shown in Fig. 3 has a clip B associated with each of the arms of the clip A, the modified construction shown in Figs. 5 and 6 employs a single clip B which is located at the angle or junction of the arms of the clip A and which has its base 3 arranged along an axis which bisects or substantially bisects the angle of said arms. The clip B in the construction shown in Figs. 5 and 6, by virtue of its arrangement at the junction of the arms of the clip A, has a modified form of lug for engagement with the top plate of the show case, the said lug, designated as 4ª, in this instance, consisting of a triangular housing and conforming to the outline of the corner of said top plate.

Any desired or approved means may be employed for fixing the clip A of the corner and intermediate fastenings to the vertical plates of the show case, such means *per se* forming no part of the invention. It is preferred and convenient, however, to utilize for this purpose the usual channel members 14 secured, preferably by cement, upon the upper edges of the vertical plates, and carrying upon their grooved upper sides a padding and packing and upon which the top plate of the show case rests. The channel members 14 have their side walls cut away as at 16 adjacent the clips A to provide clearances for said clips and their top portions extend along the tops 1 of said clips and across the bases 3 of the clips B. In this way the channel members 14 positively secure the clips A against upward displacement from the vertical plates of the show case.

The assemblage and retention of the top plate of an all-glass show case is greatly facilitated by the use of the fastenings described. After the vertical side and end plates of the show case have been assembled, the clips A are fitted in position along the upper edges of said vertical plates, the clips B are moved to positions which will permit the top plate of the show case to be laid in position and the channel members 14 are assembled in the manner shown and described. After the top plate has been placed in position and accurately centered relatively to the vertical plates, the clips B are adjusted to positions wherein the edges of said top plate are securely engaged by the lugs 4, after which the clips B are fixed against movement by adjustments of the lock members 7.

While it is within the scope of the invention to so arrange the parts of the fastening that adjustments of the lock members 7 may be made from the interior of the show case, it is preferred that such adjustments be made from the exterior of the show case, as in the embodiment shown, in order that they may be performed quickly, with ease and facility, and with no liability of breaking the glass plates by means of the tools employed. It is to be observed that while the top plate is reliably and securely held in position, the means for fastening the top plate imposes no stresses upon said top plate or upon the vertical plates. The wedge locking means employed for holding the clips B against movement have a practical efficiency equal to that of a positive lock and once adjusted are not liable to become loose for the reason that the wedges 7 not only exert a binding action against the bases 3 of the clips B but, when arranged as herein disclosed, exert an inward thrust on the screws 11, whereby the heads of said screws bind frictionally against the outer walls of the clips A. The fastenings may be inexpensively constructed and are inconspicuous, in no way detracting from the attractiveness of appearance which is one of the principal qualities of an all-glass show case. The improved fastening construction moreover renders it unnecessary to drill any holes in the bodies of the plates of the show case and, hence does not entail any weakening of said plates toward the end that an efficient jointure thereof may be effected.

Having fully described my invention, I claim:—

1. A fastening for connecting the top and vertical plates of show cases comprising a clip for engagement upon the upper edge of a vertical plate, a second clip for engagement with an outer edge of the top plate, the first clip having recesses and the second clip being slidable in said recesses transversely of the first clip, and movable wedge means operable to bind the second clip in said recesses against the first clip and to thereby fix the second clip against movement relative to the first clip or to permit movement of the second clip relative to the first clip.

2. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses and movable wedge means operable to find the second clip in said recesses and to thereby fix the second clip against movement relative to the first clip or to permit movement of the second clip relative to the first clip.

3. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses, the opposite walls of said first clip having other recesses below and communicating with said dove-tail recesses and a transversely movable wedge member fitted in said last named recesses and operable to cause the base of said second clip to bind frictionally in said dove-tail recesses or to permit said base to move freely in said dove-tail recesses.

4. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses, the opposite walls of said first clip having other recesses below and communicating with said dove-tail recesses, a transversely movable wedge member fitted in said last named recesses and operable to cause the base of said second clip to bind frictionally in said dove-tail recesses, and operating means for said wedge member comprising a lug depending from the wedge member and having a threaded opening and a screw passing loosely through an opening in one of the opposite walls of said first clip and engaging in the threaded opening of said lug.

5. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses, the opposite walls of said first clip having other recesses below and communicating with said dove-tail recesses, a transversely movable wedge member fitted in said last named recesses and operable to cause the base of said second clip to bind frictionally in said dove-tail recesses or to permit said base to move freely in said dove-tail recesses, and operating means for said wedge member comprising a lug depending from the wedge member and having a threaded opening and a screw passing loosely through an opening in the outer of the opposite walls of said first clip and engaging in the threaded opening of said lug, the wedge member having its under face inclined upwardly and outwardly and having its upper face flat.

6. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses, the opposite walls of the first clip having other recesses below and communicating with said dove-tail recesses, a transversely movable wedge member fitted in said last named recesses and operable to cause the base of said second clip to bind frictionally in said dove-tail recesses or to permit said base to move freely in said dove-tail recesses and operating means for said wedge member comprising a lug depending from the wedge member and a screw coacting with said lug and passing through an opening in one of the opposite walls of said first clip.

7. A fastening for connecting the top and vertical plates of show cases comprising a clip for engagement upon the upper edge of a vertical plate and having its opposite walls provided with dove-tail recesses extending to their upper edges, a second clip for engagement with an outer edge of the top plate and having a base which fits conformably and slidably in said recesses, the opposite walls of the first clip having other recesses below and communicating with said dove-tail recesses, a transversely movable wedge member fitted in said last named recesses and operable to cause the base of said second clip to bind frictionally in said dove-tail recesses or to permit said base to move freely in said dove-tail recesses and operating means for said wedge member comprising a lug depending from the wedge member and a screw coacting with said lug and passing through an opening in one of the opposite walls of said first clip, the wedge member being arranged whereby any tendency thereof to move in a direction to release said base will cause an inward thrust on said screw.

8. Means for clamping plates of material together comprising two clamping members in slidable engagement with each other and movable means interposed between said members for binding them frictionally against one another and thereby rendering them rigid with respect to each other and fixed in clamping position.

9. Means for connecting a plurality of plates or sheets of material together comprising a plurality of clip members in slidable engagement with each other and adapted to engage said plates, and wedging movable means interposed between said clip members for binding them frictionally against one another and thereby rendering them rigid with respect to each other and fixed in clamping position.

10. Means for connecting plates or sheets of material together comprising a clip member consisting of a channel formation adapted to straddle the edge of one of said plates, a second clip member in slidable engagement with said first clip member and adapted to be moved in engagement with another of said plates, whereby said plate is held in position, a wedge member interposed between said clip members and provided with a lug extending into the channel of said first clip member and having a threaded opening therein, and a set screw extending through said channel member in threaded engagement with said lug, whereby said wedge may be actuated to render the clips rigid with respect to each other and fixed in clamping position.

11. A fastening for connecting the top and vertical plates of show cases comprising a clip for engagement upon the upper edge of a vertical plate, a second clip for engagement with an outer edge of the top plate and being slidably adjustable transversely of the first clip, and means operable to frictionally bind the clips against one another and to thereby fix them in rigid relation, the means including a movable binding element for said clips and an adjusting screw for operating said element.

12. A fastening for connecting the top and vertical plates of show cases comprising a clip for engagement upon the upper edge of a vertical plate, a second clip for engagement with an outer edge of the top plate and being slidably adjustable transversely of the first clip, and movable means interposed between the clips and operable to frictionally bind them against one another and to thereby fix them in rigid relation.

13. A fastening for connecting the top and vertical plates of show cases comprising a clip for engagement upon the upper edge of a vertical plate, a second clip for engagement with an outer edge of the top plate and being slidably adjustable transversely of the first clip, and a movable locking element holding the clips rigid with respect to one another, the said element exerting opposed thrusts wholly against the clips.

In testimony whereof I have hereunto set my hand in presence of two subscribing witnesses.

HARRY R. RUSE.

Witnesses:
 CHARLES E. ORTH,
 ISAAC T. PARKS, Jr.

Copies of this patent may be obtained for five cents each, by addressing the "Commissioner of Patents, Washington, D. C."